US008296548B2

(12) United States Patent
Dvir et al.

(10) Patent No.: US 8,296,548 B2
(45) Date of Patent: Oct. 23, 2012

(54) DEVICE AND METHOD FOR FINDING EXTREME VALUES IN A DATA BLOCK

(75) Inventors: Moti Dvir, Kiryat Ono (IL); Evgeni Ginzburg, Petah Tikva (IL); Adi Katz, Ramat Gan (IL)

(73) Assignee: Freescale Semiconductor, Inc., Austin, TX (US)

( * ) Notice: Subject to any disclaimer, the term of this patent is extended or adjusted under 35 U.S.C. 154(b) by 546 days.

(21) Appl. No.: 12/161,518

(22) PCT Filed: Jan. 18, 2006

(86) PCT No.: PCT/IB2006/050192
§ 371 (c)(1),
(2), (4) Date: Jul. 18, 2008

(87) PCT Pub. No.: WO2007/083199
PCT Pub. Date: Jul. 26, 2007

(65) Prior Publication Data
US 2009/0070555 A1    Mar. 12, 2009

(51) Int. Cl.
*G06F 9/30* (2006.01)
(52) U.S. Cl. ............................................ 712/7; 708/207
(58) Field of Classification Search ........................ None
See application file for complete search history.

(56) References Cited

U.S. PATENT DOCUMENTS

| | | | |
|---|---|---|---|
| 4,774,688 A | 9/1988 | Kobayashi et al. | |
| 5,651,121 A * | 7/1997 | Davies | 712/200 |
| 5,822,557 A | 10/1998 | Suetake et al. | |
| 5,903,769 A | 5/1999 | Arya | |
| 6,128,614 A * | 10/2000 | Mennemeier et al. | 707/696 |
| 6,470,440 B1 * | 10/2002 | Nguyen et al. | 712/7 |
| 7,028,171 B2 * | 4/2006 | Sheaffer | 712/224 |
| 7,434,034 B2 * | 10/2008 | Selvaggi et al. | 712/221 |
| 2002/0194232 A1 * | 12/2002 | Walster | 708/207 |
| 2003/0188143 A1 * | 10/2003 | Sheaffer | 712/236 |

FOREIGN PATENT DOCUMENTS

| | | | |
|---|---|---|---|
| JP | 05181642 A | * | 7/1993 |
| WO | 0227475 A2 | | 4/2002 |
| WO | 2004066141 A2 | | 8/2004 |

OTHER PUBLICATIONS

Hatta, Koichi. "Arithmetic Unit" Machine English translation of the above JP foreign patent document, published Jul. 1993.*
Diefendorff, K., et al., "AltiVec Extension to PowerPC Accelerates Media Processing," IEEE Micro, Mar.-Apr. 2000, pp. 85-95.

* cited by examiner

*Primary Examiner* — Jacob A Petranek

(57) ABSTRACT

A method for locating an extreme value data chunk within a data block, the method includes: fetching, by a processor, an instruction; fetching, in response to a content of the instruction, a data unit that comprises multiple data chunks; selectively masking the fetched data chunks in response to a value of a mask; comparing, by a hardware accelerator, between values of valid data chunks to provide a extreme value data chunk; wherein valid data chunks include un-masked data chunks that belong to the data block; updating the value of the mask and jumping to the stage of fetching a new data unit, until the whole data block is fetched.

20 Claims, 8 Drawing Sheets

DEVICE AND METHOD FOR FINDING EXTREME VALUES IN A DATA BLOCK

FIELD OF THE INVENTION

The present invention relates to a device and a method for finding extreme values in a data block.

BACKGROUND OF THE INVENTION

Modern processors are required to execute complex tasks at very high speeds. The introduction of pipelined processor architectures improved the performances of modern processors but also introduced some problems. In a pipelined architecture an execution of an instruction is split to multiple stages.

One of the most commonly used mathematical operations is finding extreme values such as minimum values and maximal values within an array Typically, the searching process was implemented by multiple instructions. Various loops and conditional branches were used in order to find the minimal or maximal value of an array of numbers.

U.S. patent application publication serial number 2003/0188143 of Scheaffer described a method for utilizing one 2N-way minimum/maximum instruction using N-stage 2-way minimum/maximum blocks.

In many cases the size of data blocks can change dramatically from application from another. In addition, the size of various data blocks can differ than $2^N$. In addition, in many cases not all the data chunks that belong to a data block are relevant to the extreme value search process.

There is a need to provide an efficient method and device for finding extreme values in a data block.

SUMMARY OF THE PRESENT INVENTION

A method and device for finding an extreme value within a data block, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

The following description refers to methods and systems for finding an extreme value within a data block.

A data block include multiple data chunks. The device and method are adapted to manage data blocks of different sizes as well as data chunks of different sizes. An extreme value data chunk is a data chunk that has an extreme value. For example, a minimal value data chunk is a data chunk that has the smallest (or minimal) value out of the data chunks that are included in the data block.

It is noted that the device and method can provide the extreme value, the location of an extreme value data chunk, or provide both the extreme value as well as the location of the extreme value data chunk.

A method for locating an extreme value data chunk within a data block is provided. The method includes: (i) fetching, by a processor, an instruction, (ii) fetching, in response to a content of the instruction, a data unit that includes multiple data chunks; (iii) selectively masking the fetched data chunks in response to a value of a mask; (iv) comparing, by a hardware accelerator, between values of valid data chunks to provide a extreme value data chunk; wherein valid data chunks include un-masked data chunks that belong to the data block; and (v) updating the value of the mask and jumping to the stage of fetching a new data unit, until the whole data block is fetched.

A device for locating an extreme value data chunk within a data block is provided. The device includes: (a) a memory unit that is adapted to store data units, (b) a processor that is adapted to fetch an instruction and selectively generate control signals in response to the fetched instruction; and (c) a hardware accelerator, adapted to receive control signals from the processor and to be connected to the memory unit. The hardware accelerator is further adapted to: (i) receive control signals from the processor, (ii) fetch a data unit that includes multiple data chunks; (iii) selectively mask the fetched data chunks in response to a value of a mask; (iv) compare between values of valid data chunks to provide a extreme value data chunk; wherein valid data chunks include un-masked data chunks that belong to the data block; and (v) determine whether to fetch a new data unit and update the value of the mask.

Figure 1:
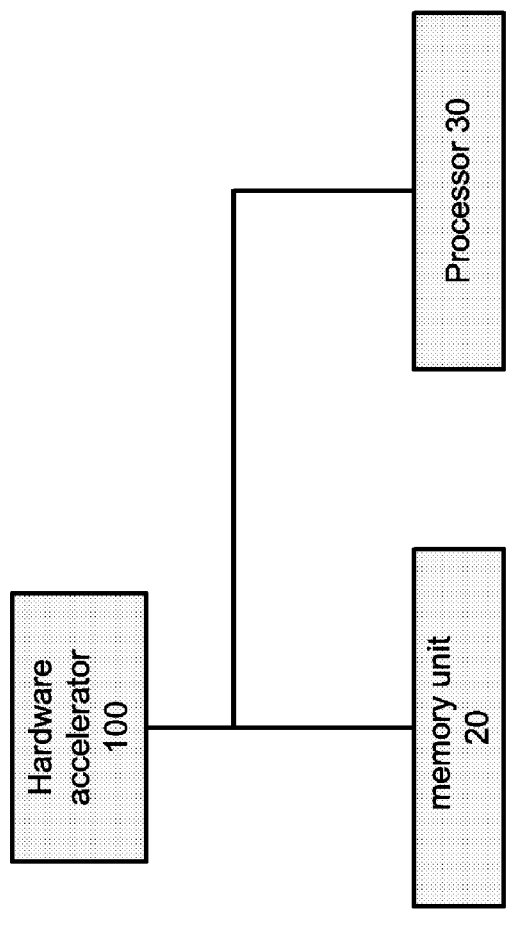
FIG. 1 is a schematic illustration of a device according to an embodiment of the invention.

FIG. 1 illustrates device 10, according to an embodiment of the invention. Device 10 can be an integrated circuit, multiple integrated circuits, a mobile phone, personal data accessory, media player, computer, and the like. Those of skill in the art will appreciate that device 10 can include many components and units that are not illustrated in FIG. 1, as well as include fewer components or other components than those that are illustrated in FIG. 1.

Device 10 includes a processor 30, a memory unit 20 and a hardware accelerator 100. They are connected to a single bus, although they can be connected to each other via additional or alternative components. The device 10 can include multiple processors, multiple memory units, one or more DMA controllers, cache memories, peripherals, interconnects and the like.

The hardware accelerator can receive an instruction from processor 20 and perform an extreme value operation while the processor continues to process other instructions.

Conveniently, the processor 20 is a pipelined processor. It can include multiple pipelines stages. Conveniently, it includes a fetch unit, an issue unit, an execute unit and a write-back unit. Typically, ALU related instructions are executing in a four-processor cycles (fetch, decode, execute ALU operation and write-back), while load instructions are executed in four or five processor cycles.

Conveniently, the processor may execute many instructions without being assisted by the hardware accelerator 100. Nevertheless, some instructions such as MIN instruction 240, MINI instruction 260, MAX instruction 200 and MAXI instruction 220 (collectively referred to as extreme value instructions) are executed mainly by the hardware accelerator 100.

The processor 20 and the hardware accelerator 100 can communicate in various manners. They can communicate by using various well-known communication schemes. These schemes can include handshaking, interrupts, and the like. Conveniently, the processor sends a MIN instruction 240, a MINI instruction 260, a MAX instruction 200 or a MAXI instruction 220 to the hardware processor 100. It can also send a modified instruction to the hardware accelerator 100, send only few fields of the instruction or otherwise send dedicated signals to the hardware accelerator 100 in order to initiate an extreme value search operation. The various signals or instructions are referred to as control signals.

The hardware accelerator 100 can have its own decoder, in order to decode hardware accelerator instructions (such as but not necessarily limited to extreme value instructions) it receives from processor 30.

The device 10 can search an extreme value data chunk within a data block, whereas the data block size can differ from $2^x$. The device 10 can search the extreme value data chunk within large data blocks, and especially data blocks that cannot be processed by the hardware accelerator 100 in a single search sequence.

The hardware accelerator 100 can be adapted to search for data chunks of different sizes, within data blocks of different sizes, and is also able to mask data chunks.

Conveniently, the processor 30 fetches an instruction from memory unit 20 or from an instruction memory unit (not shown), which can be a non-volatile memory unit. Processor 30 then decodes the fetched instruction and if it is an extreme value instruction it sends control signals to the hardware accelerator and then it can continue to process other instructions that are in the pipeline.

Figure 3:
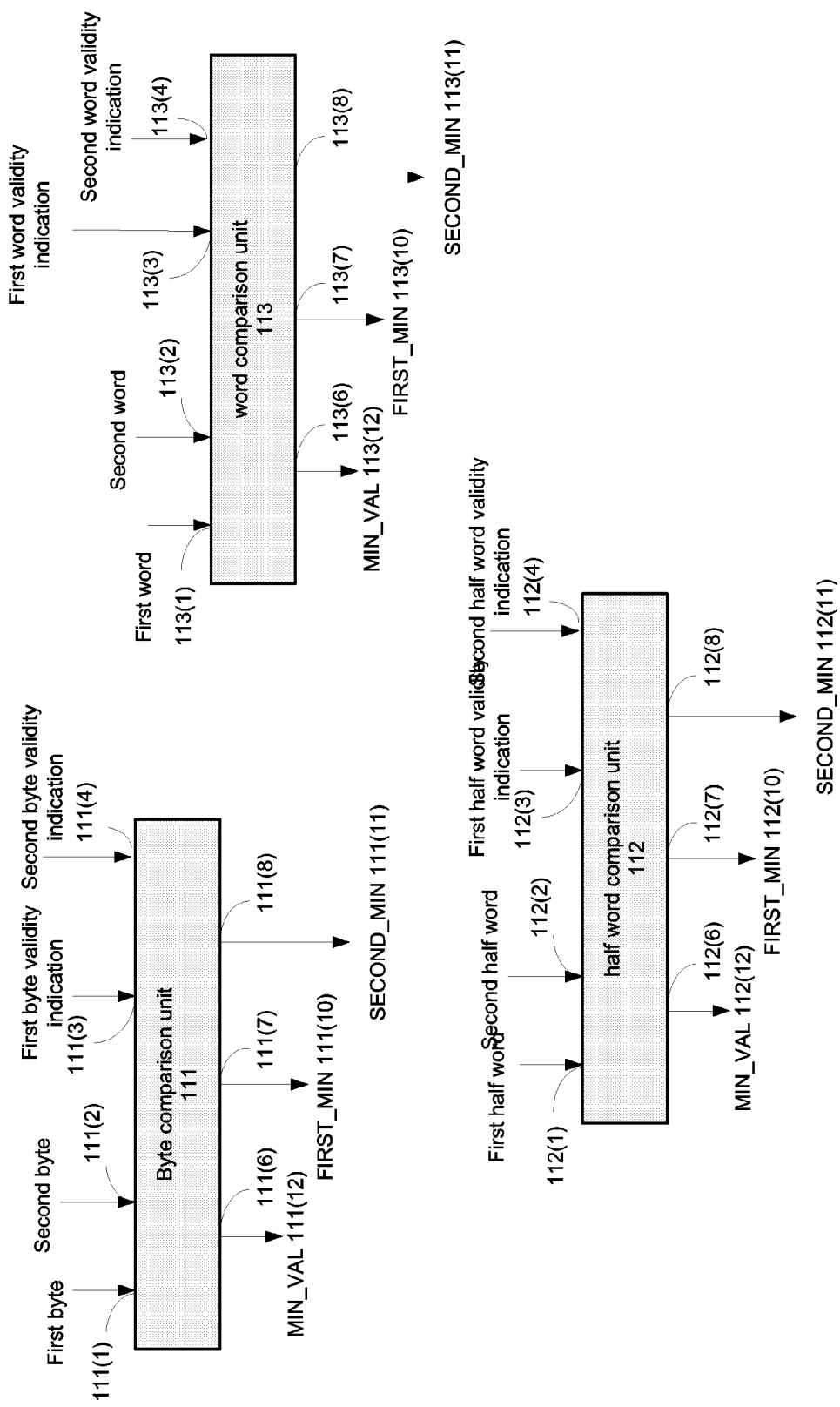
FIG. 3 illustrates various comparison components, according to an embodiment of the invention.

According to an embodiment of the invention the hardware accelerator 100 include multiple comparison units (for example, comparison units 111-119 of FIG. 3) as well as one or more controllers (for example, controller 119 of FIG. 3).

The one or more controllers can be adapted to: (i) Generate valid indications in response to a value of a mask and in response to the belonging of data chunks to the data block that is being searched for extreme values. (ii) Determine which data chunk is the extreme value data chunk, in response to signals outputted by the comparison units and in response to the validity of the compared data chunks. (iii) Control data unit fetch operations. (iv) Selectively change the value of a one or more masks between data unit processing sequences.

For example, assuming that: (i) a data chunk is a byte long, (ii) the hardware accelerator is adapted to process data units of eight bytes at a time, and (iii) the size of the data block is thirteen data chunks. Then, the hardware accelerator fetches and processes all the first eight data chunks. After this processing is completed the hardware accelerator fetches another eight data chunks but invalidated the last three bytes of the second data unit.

Yet for another example, assuming that: (i) the data unit is eight byte long, (ii) the data block is sixteen bytes long, and (iii) the mask value indicates that the second and tenth data bytes should be masked. Then, the second and tenth bytes of the data bytes are marked as invalid.

According to an embodiment of the invention the mask includes a bit for each data chunk of the data block. The hardware accelerator 100 processes only one data unit during a data unit sequence. Accordingly, only a portion of the mask is relevant per data unit processing sequence. In order to provide the relevant mask portion during each data unit processing sequence the mask value is updated (for example—rotated) after each data unit processing sequence. Thus, the same bits of a register or another storage components that store the mask can be provided to the comparison units, although their content reflects different portions of the mask.

Figure 2:
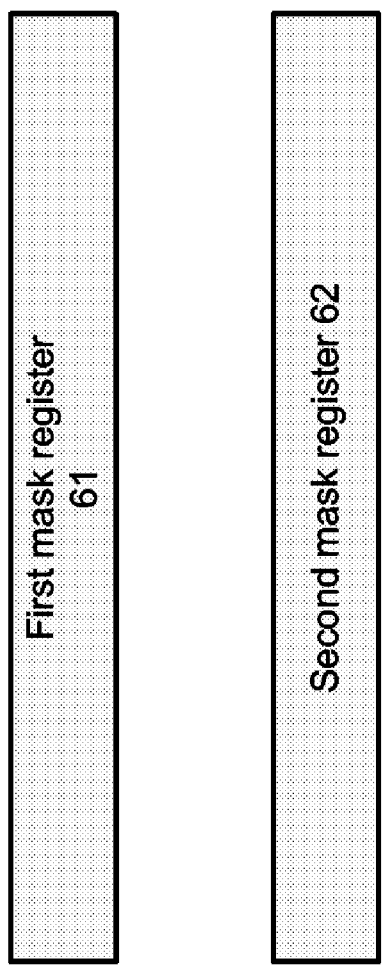
FIG. 2 illustrates some registers that belong to a register file according to an embodiment of the invention.

FIG. 2 illustrates two mask registers 61 and 62, according to an embodiment of the invention.

It is noted that these registers can belong to processor 30, can belong to the hardware accelerator 100 or can be shared by processor 30 and hardware accelerator 100.

Initially, the first mask register 61 stores the upper portion of a mask while the second mask register 62 can store a lower portion of a mask. Conveniently, a mask can be stored in additional registers or within a single register, depending upon the size of each register and the length of the mask. The inventors used a sixty-four bit mask and thirty-two bit registers.

For example, it is assumed that: (i) the mask (within registers 61 and 62) includes a bit for each byte of a sixty-four data block, (ii) each data unit includes eight bytes, and (iii) only eight bits from the mask are provided per data unit processing sequence. Then, after each such data unit processing sequence the content of the mask is rotated by a byte.

Yet for another embodiment of the invention, the device 10 can include a multiplexer that selectively sends the relevant mask bits during each data unit processing sequence.

FIG. 3 illustrates various comparison units 111, 121 and 131, according to an embodiment of the invention.

According to an embodiment of the invention a comparison unit can perform minimum finding operation. According to another embodiment a comparison unit can perform a maximum finding operation. According to a further operation the comparison unit can perform both minimum and maximum finding operations. Yet according to another embodiment of the invention a comparison unit can perform a match operation.

Furthermore, a maximum finding comparison unit can perform a minimum finding operation by inverting the receive data chunks. The inversion can be performed by a controller such as controllers 119, 129 and 139 of FIGS. 4, 5 and 6 accordingly.

For simplicity of explanation the illustrated comparison units perform minimum operations but can also be used for performing match operations.

The comparison units (111, 121 and 131) differ from each other by the size of data chunks that they are able to compare to each other. For simplicity of explanation FIG. 3 illustrates a byte comparison unit 111, a half word comparison unit 121 and a word comparison unit. It is noted that other sized comparison units can be used.

Byte comparison unit 111 compares between two data chunks that are one byte long. Comparison unit 111 includes multiple inputs 111(1)-111(4) and multiple outputs 111(6)-111(8).

The first input 111(1) receives a first byte, the second input 111(2) receives a second byte, the third input 111(3) receives a first byte validity indication and the fourth input 111(4) receives a second byte validity indication. The first output 111(6) outputs the value (MIN_VAL 111(12)) of the smaller byte out of the first and second bytes. The second output 111(7) asserts a FIRST_MIN output signal 111(10) if the first byte is smaller than the second byte. The third output 111(8) asserts a SECOND_MIN output signal 111(11) if the second byte is smaller than the first byte. Conveniently, both FIRST_MIN 111(10) and SECOND_MIN 111(11) are negated if both the first and second bytes match (are equal to each other).

According to an embodiment of the invention if the comparison receives an indication that a certain byte is not valid it assigns it a default value. For example, when searching for a smallest data chunk that default value can be '11111111' while when searching for a maximal value data chunk the default value can be '00000000'.

It is noted that a controller (such as controller 119 of FIG. 4) that is connected to the comparison unit 111 should be aware of the validity of each byte. Thus, if a comparison unit 111 compares between a valid byte and a non-valid byte and their values match each other, the controller 119 should be able to ignore the non-valid byte and select the valid byte as the smaller byte. If a certain comparison unit compares between two non-valid bytes then the controller 119 should ignore the output of that comparison unit.

According to various embodiments of the invention the assignment of the default value can be performed by the comparison unit 111 or by another component, such as the controller 119.

Half word comparison unit 121 compares between two data chunks that are two bytes long. Comparison unit 121 includes multiple inputs 121(1)-121(4) and multiple outputs 121(6)-121(8).

The first input 121(1) receives a first half word, a second input 121(2) receives a second half word, a third input 121(3) receives a first half word validity indication and a fourth input 121(4) receives a second half word validity indication. A first output 121(6) outputs the value (MIN_VAL 121(12)) of the smaller half word out of the first and second input half words. The second output 121(7) asserts a FIRST_MIN output signal 121(10) if the first half word is smaller than the second half word. The third output 121(8) asserts a SECOND_MIN output signal 121(11) if the second half word is smaller than the first half word. Conveniently, both FIRST_MIN 121(10) and SECOND_MIN 121(11) are negated if both the first and second half words match (are equal to each other).

Word comparison unit 131 compares between two data chunks that are four bytes long. Comparison unit 131 includes multiple inputs 131(1)-131(4) and multiple outputs 131(6)-131(8).

The first input 131(1) receives a first word, a second input 131(2) receives a second word, a third input 131(3) receives a first word validity indication and a fourth input 131(4) receives a second word validity indication. A first output 131(6) outputs the value (MIN_VAL 131(12)) of the smaller word out of the first and second input words. The second output 131(7) asserts a FIRST_MIN output signal 131(10) if the first word is smaller than the second word. The third output 131(8) asserts a SECOND_MIN output signal 131(11) if the second word is smaller than the first word. Conveniently, both FIRST_MIN 131(10) and SECOND_MIN 131(11) are negated if both the first and second words match (are equal to each other).

Figure 4:
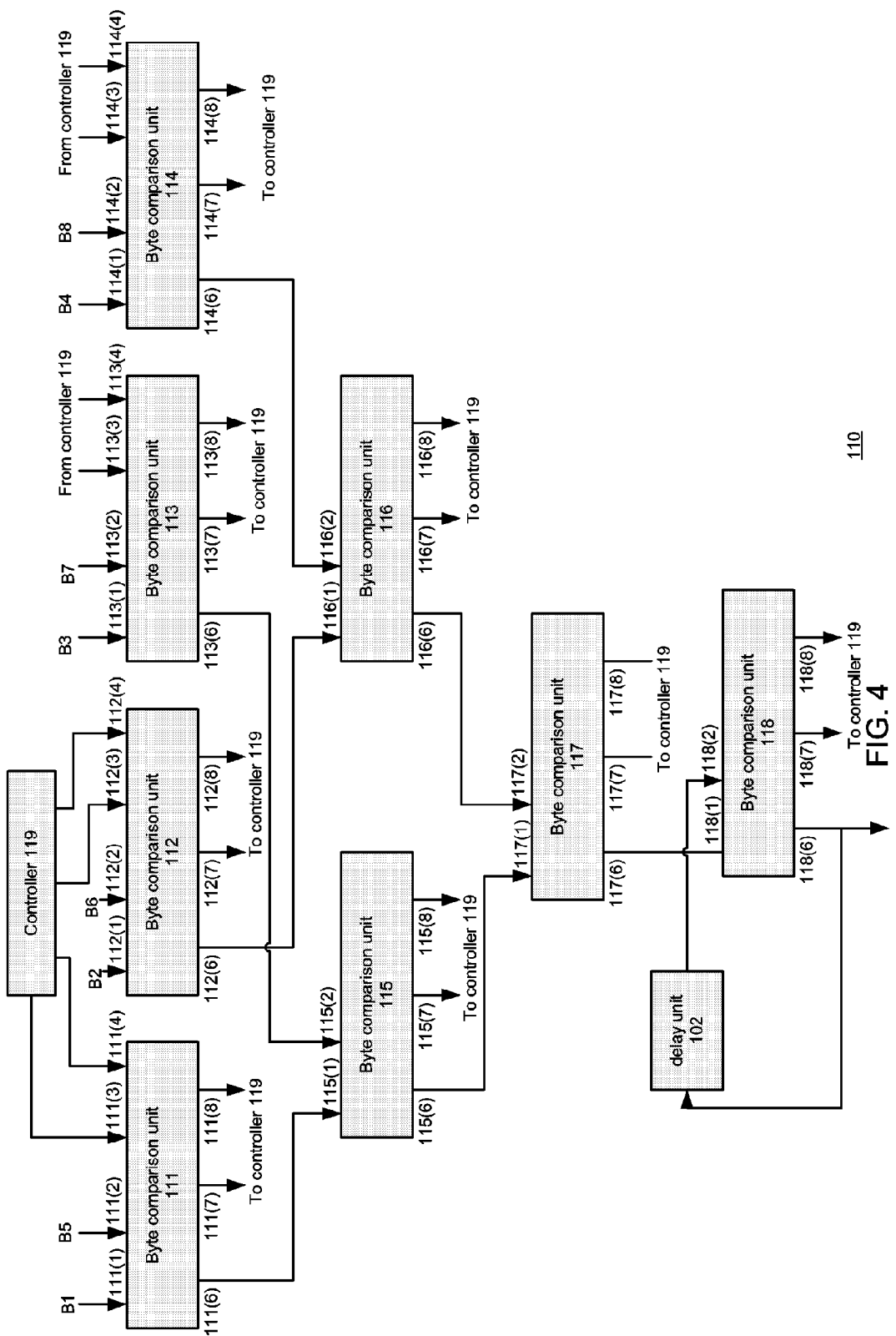
FIG. 4 illustrates a minimum data byte search unit, according to an embodiment of the invention.

FIG. 4 illustrates a minimum data byte search unit 110, according to an embodiment of the invention.

The minimum data byte search unit 110 searches for a smallest byte within an eight byte long data unit. It is noted that other sized data units require a different number of comparison units.

Minimum data byte search unit 110 includes a first row of four comparison units 111-114, each comparing between a pair of bytes of the eight byte long data unit. These four comparison units 111-114 are connected to a second row of two comparison units 115 and 116. The second row of comparison units is connected to a seventh comparison unit 117. The seventh comparison unit 117 and a delay unit 102 (that stores a previously found smallest byte) are connected to an eighth comparison unit 118 that outputs an intermediate smallest byte.

The comparison units 111-118 are also connected to a controller that can provide them byte validity indication and also determines the identity of the intermediate smallest byte.

The first byte till the eighth byte of the data unit are referred to as B1-B8. The validity indications of there bytes are referred to as V1-V8.

The following table illustrates the signals that are provided to various inputs of comparison units 111-119. MIN_VAL 111(12)-MIN_VAL117(11) are the values of the smallest bytes outputted from comparison units 111-117 accordingly.

FIRST_MIN 111(10)-FIRST_MIN 118(10) are output signals that are outputted from comparison units 111-118 to indicate if the first byte received by each of these comparison units is smaller than the second byte received by these comparison units.

SECOND_MIN 111(11)-SECOND_MIN 118(11) are output signals that are outputted from comparison units 111-118 to indicate if the second bytes received by each of these comparison units is smaller than the first bytes received by these comparison units.

The eighth comparison unit 118 compares the smallest byte of the currently received data unit to a previously located minimal value byte (referred to as pervious minimal byte.

| Unit | First input | second input | Third input | Fourth input |
|---|---|---|---|---|
| 111 | B1 | B5 | V1 | V5 |
| 112 | B2 | B6 | V2 | V6 |
| 113 | B3 | B7 | V3 | V7 |
| 114 | B4 | B8 | V4 | V8 |
| 115 | MIN_VAL 111(12) | MIN_VAL 113(12) | Φ | Φ |
| 116 | MIN_VAL 112(12) | MIN_VAL 114(12) | Φ | Φ |
| 117 | MIN_VAL 115(12) | MIN_VAL 116(12) | Φ | Φ |
| 118 | MIN_VAL 117(12) | Previous minimal byte | Φ | Φ |

The data path described above output an intermediate smallest data byte. Each time a data unit is processed this intermediate smallest byte can be updated. When the last data unit of the data block is fetched and processed the eighth comparison unit 118 outputs a MIN_VAL 118(12) output signal that has the value of the smallest byte within the data block.

The previous table illustrated the data path of the minimum data byte search unit 110. The minimum data byte search unit 110 also includes a control path that can provide the identity (or location) of the smallest data chunk. The control path includes a controller 119 that determines the identity of the smallest byte in response to the output signals provided by comparison units 111-118. These output signals include output signals FIRST_MIN 111(10)-FIRST_MIN 118(10), and SECOND_MIN 111(11)-SECOND_MIN 118(11).

Figure 5:
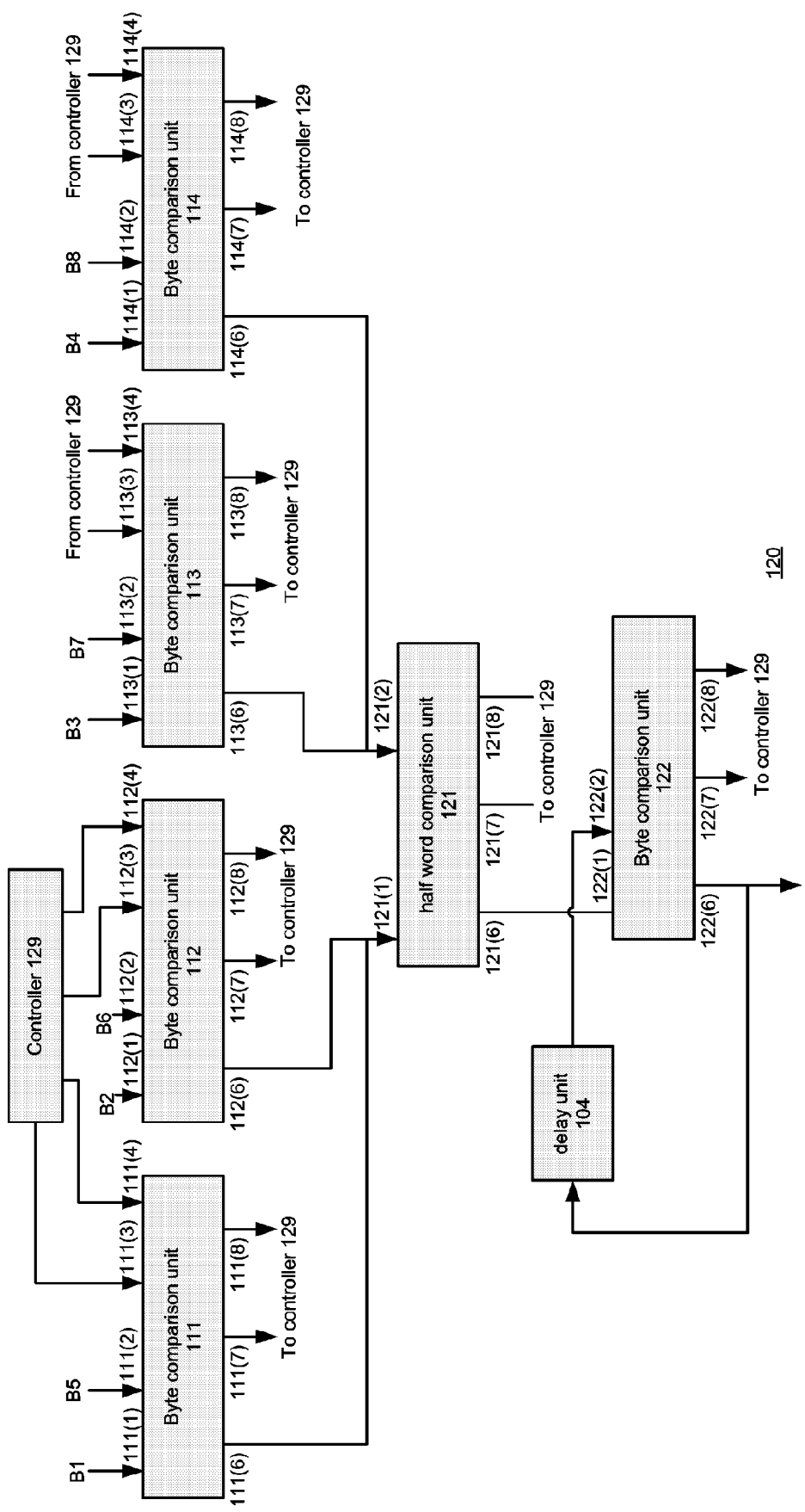
FIG. 5 illustrates a minimum data half word search unit, according to an embodiment of the invention.

FIG. 5 illustrates a minimum data half word search unit 120, according to an embodiment of the invention.

The minimum half word search unit 120 includes a first layer of four comparison units 111-114. Byte comparison units 111-114 are connected to a first half word comparison unit 121. The first half word comparison unit 121 and a delay unit 104 are connected to a second half word comparison unit 122 that finds the minimal value of a previously located minimal half word and the smallest half word in the currently processed data unit.

Figure 6:
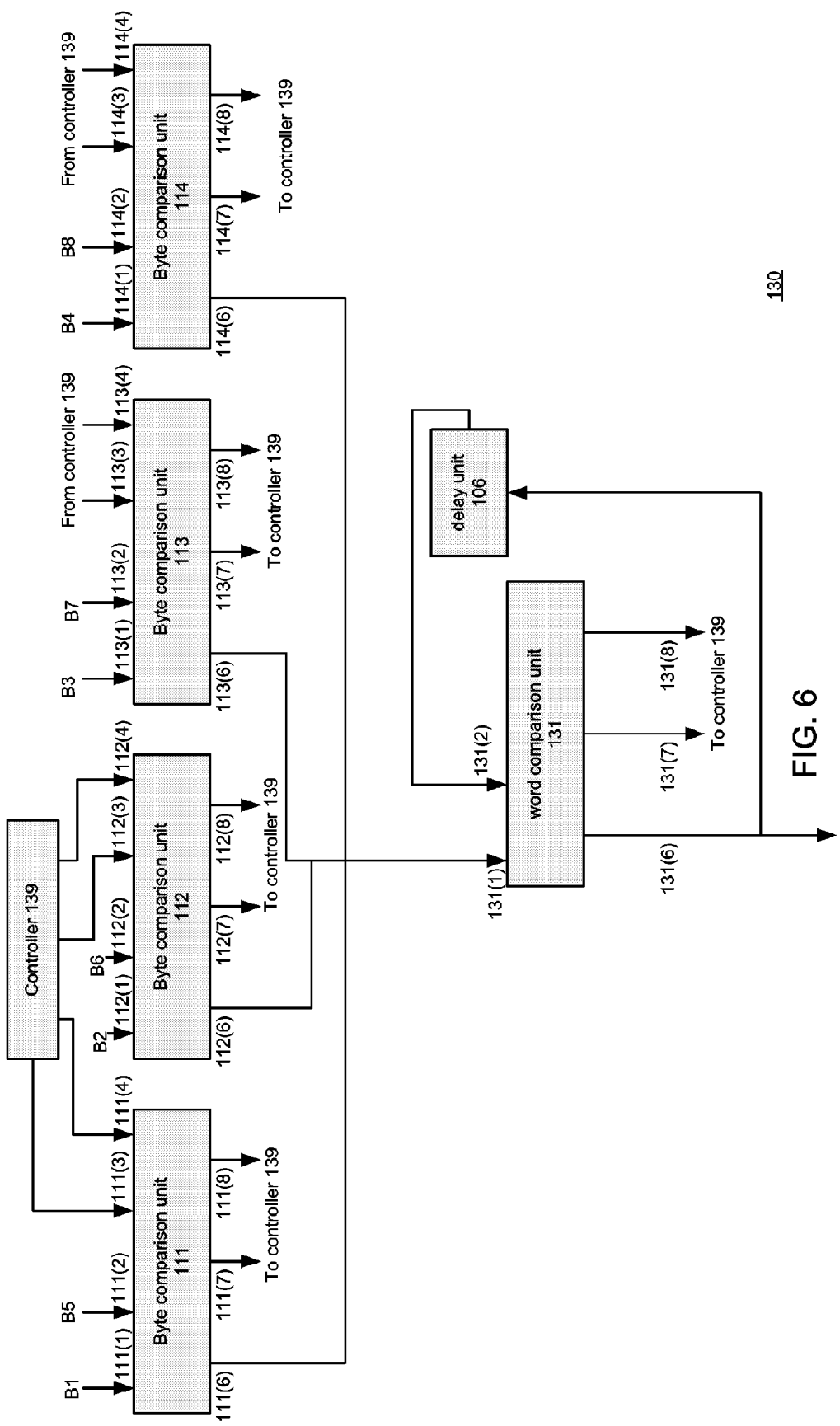
FIG. 6 illustrates a minimum data word search unit, according to an embodiment of the invention.

FIG. 6 illustrates a minimum data word search unit 130, according to an embodiment of the invention.

The minimum half word search unit 120 includes a first layer of four byte comparison units 111-114. These four byte comparison units 111-114 are connected to a word comparison unit 121. The word comparison unit 121 is also connected to a delay unit 104 that provides a previously located minimal word.

Figure 7:
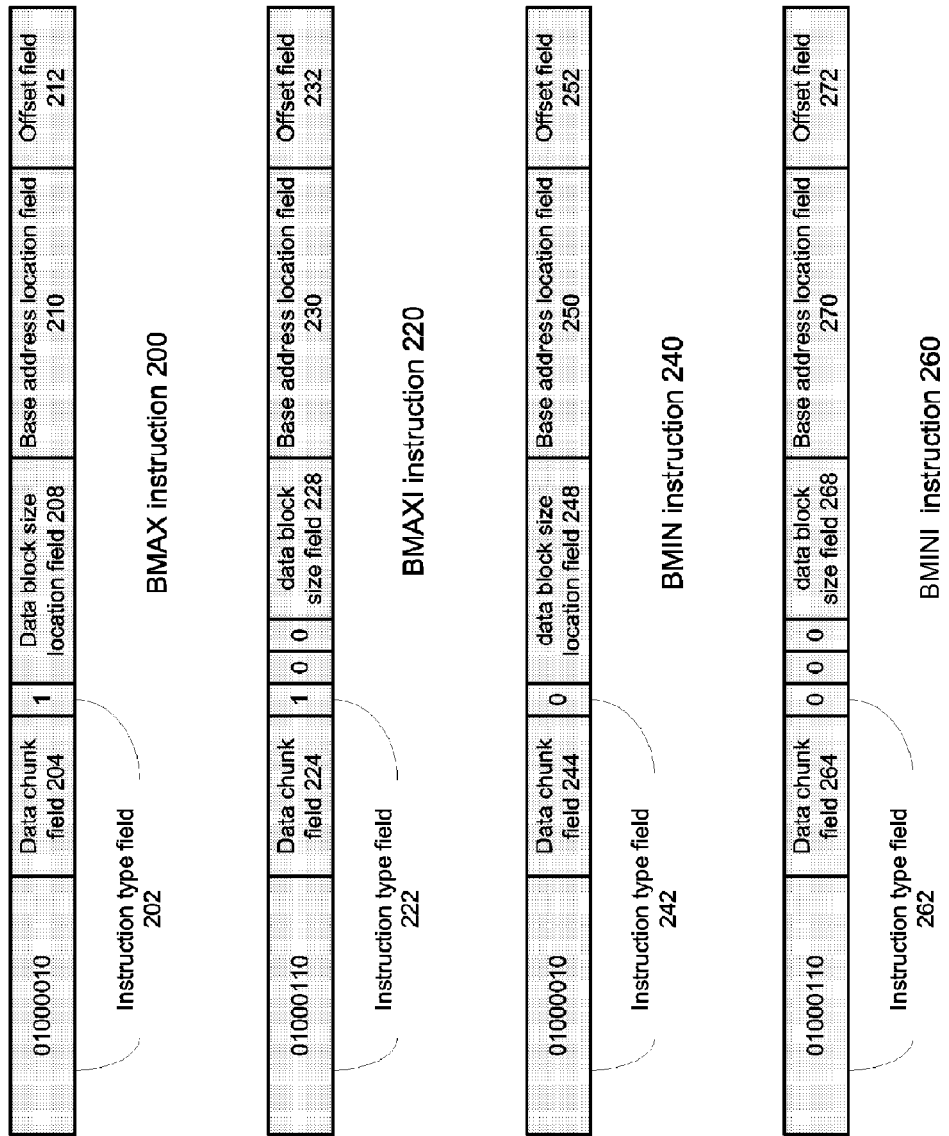
FIG. 7 illustrates a MAX instruction, a MAXI instruction, a MIN instruction and a MINI instruction, according to various embodiments of the invention.

FIG. 7 illustrates a BMAX instruction 200, a BMAXI instruction 220, a BMIN instruction 240 and a BMINI instruction 260, according to various embodiments of the invention.

The following description uses terms such as RA, RB and RC. Conveniently these are general-purpose registers of the processor 30 or of the hardware accelerator 100.

BMAX instruction 200 includes an instruction type field 202, a data chunk size field 204, a data unit size location field 208, a base address location field 210, an offset value field 212.

The instruction type field 202 includes a code that indicates that instruction 200 is a find maximal data chunk within a data unit instruction in which the size of the data block should be fetched from a certain location. The inventors used the following code '010000101' but other codes can be used.

Data chunk size field 204 indicates the size of the data chunk. For example values of zero, one and two indicate a byte sized data chunk, a half word sized data chunk and a word sized data chunk. It is noted that larger sized can be indicated by using more bits.

The data unit size location field 208 indicates a register that stores the size of data unit. It can also point to an entry within a memory unit.

The base address location field 210 and the offset value field 212 indicate where the data block starts. Typically, the base address location field 210 points to a location of the base address. The base address can be store din a register but this is not necessarily so. The offset value field 210 stores the actual offset. This is not necessarily so. The offset can be positive or negative.

BMAXI instruction 220 includes an instruction type field 222, a data chunk size field 224, a data unit size field 228, a base address location field 230, and an offset value field 232.

The instruction type field 222, data chunk size field 224, base address location field 230, offset value field 232 and the irrelevant bits 226 are analogues to instruction type field 202, data chunk size field 204, a base address location field 210, and offset value field 212.

The instruction type field 222 includes a code that indicates that instruction 220 is a find maximal data chunk within a data unit instruction in which the size of the data block is immediate coded. The inventors used the following code '010001101' but other codes can be used.

The data unit size field 228 either represents the data block field or can indicate an offset from a value stored in predefined control registers. The inventors used various codes to indicate the size of the data block and different codes to indicate an offset from a value stored in predefined control registers. For example, values 2-7 indicated a data block size of 4-64 bytes. A value of zero indicated an offset of one byte from a value of six bits of a first control register. A value of one indicated an offset of one byte from a value of six bits of a second control register.

BMIN instruction 240 includes an instruction type field 242, a data chunk size field 244, a data unit size location field 248, a base address location field 250, and an offset value field 252.

The instruction type field 242 includes a code that indicates that instruction 240 is a find minimal data chunk within a data unit instruction in which the size of the data block should be fetched from a certain location. The inventors used the following code '010000100' but other codes can be used.

Instruction type field 242, data chunk size field 244, data unit size location field 248, base address location field 250, and offset value field 252 are analogues to instruction type field 202, data chunk size field 204, data unit size location field 208, base address location field 210, and offset value field 212.

BMINI instruction 260 includes an instruction type field 262, a data chunk size field 264, a data unit size field 268, a base address location field 270, and an offset value field 272.

The instruction type field 262 includes a code that indicates that instruction 260 is a find minimal data chunk within a data unit instruction in which the size of the data block is immediately coded. The inventors used the following code '010001100' but other codes can be used.

Instruction type field 262, data chunk size field 264, data unit size field 268, base address location field 270, and offset value field 272 are analogues to instruction type field 222, data chunk size field 224, data unit size field 228, base address location field 230, and offset value field 232.

Figure 8:
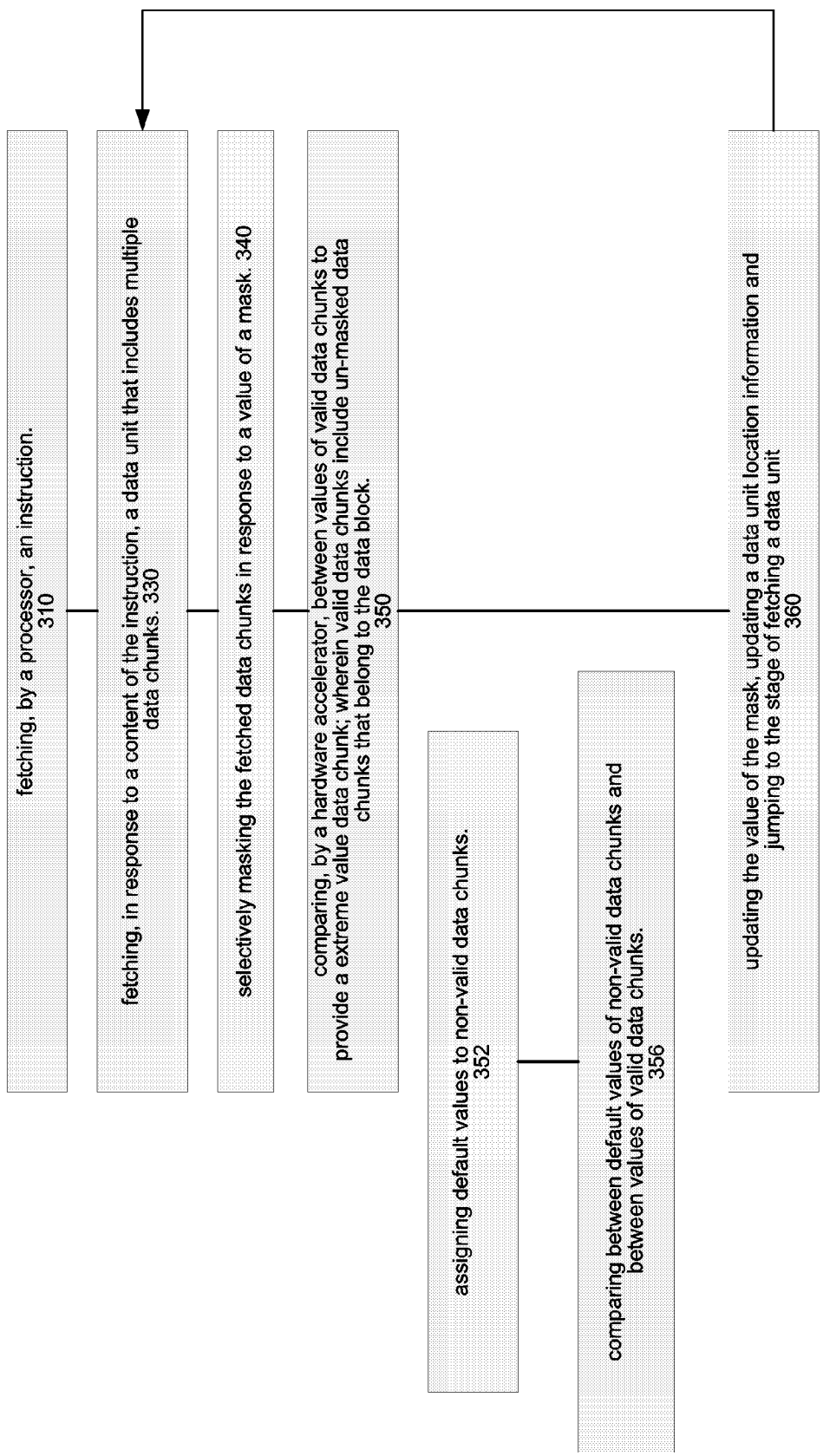
FIG. 8 illustrates a method for finding an extreme value data unit, according to an embodiment of the invention.

FIG. 8 illustrates method 300 for finding an extreme value data unit, according to an embodiment of the invention.

According to an embodiment of the invention method 300 can be applied for locating a minimal data unit alone. According to yet another embodiment of the invention method 300 can be applied for locating a maximal data unit alone. Conveniently, method 300 can be applied for locating both a maximal data unit and a minimal data unit, and it includes a stage of selecting between these two computations. According to yet another embodiment of the invention method 300 can be applied for finding matching data units.

Method 300 starts by stage 310 of fetching, by a processor, an instruction. Stage 310 can also include decoding the instruction and sending control signals to a hardware accelerator so that the hardware accelerator performs a minimum search or a maximum search within a data block.

Stage 310 is followed by stage 330 of fetching, in response to a content of the instruction, a data unit that includes multiple data chunks. Stage 310 may include fetching an instruction (such as instruction MAXI or MINI) that includes a data unit size value. Stage 310 may also include fetching an instruction (such as instruction MAX or MIN) that includes a data unit size location field.

Stage 330 is followed by stage 340 of selectively masking the fetched data chunks in response to a value of a mask.

Stage 340 is followed by stage 350 of comparing, by a hardware accelerator, between values of valid data chunks to provide a extreme value data chunk; wherein valid data chunks include un-masked data chunks that belong to the data block. Conveniently, the comparison include comparing between value of data chunks that belong to a currently fetched data unit. The extreme value data chunk of the currently fetched data unit is compared to a previously found extreme value data chunk. During a processing of a first data unit of a certain data block there is no previously found data block, thus the extreme value data chunk of the currently fetched data unit can be compared to a default value. Conveniently, the comparing includes performing multiple comparison operations in parallel.

Stage 350 is followed by stage 360 of updating the value of the mask, updating a data unit location information and jumping to stage 330, until the whole data block is fetched and processed. Stage 330 then includes fetching a new data unit.

Conveniently, the updating is responsive to a size of the data chunk. Conveniently, the updating includes rotating the mask by a data chunk size.

Conveniently the comparing includes stages 352 and 356. Stage 352 includes assigning default values to non-valid data chunks. Stage 356 includes comparing between default values of non-valid data chunks and between values of valid data chunks.

Stage 350 usually includes: comparing comprises providing a pair of data chunks and data chunk validity information to a comparison unit, assigning a default value to a non-valid data chunk; comparing, by the comparison unit, between values of the data chunks to provide an identity of an extreme value data chunk of the pair of data chunks and to provide an extreme value of the pair of data chunks.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for locating an extreme value data chunk within a data block, the method comprises:
   fetching by a processor, an instruction, wherein the instruction includes:
   a data chunk size field;
   a data block size field; and
   a data block base address field; and
   in response to the processor executing only the instruction:
      fetching, in response to a content of the instruction, a data unit of a plurality of data units that comprises multiple data chunks, the size of each data chunk being determined by the data chunk size field, wherein the data block comprises the plurality of data units that are located at an address that is associated with the data block base address and the data block size field;
      selectively masking the fetched data chunks in response to a value of a mask;
      comparing, by a hardware accelerator, between values of valid data chunks of the data unit to provide a first extreme value data chunk of the data unit;
         wherein valid data chunks include un-masked data chunks that belong to the data block, and wherein the comparing comprises performing multiple comparison operations in parallel;
      comparing, by the hardware accelerator, between the first extreme value data chunk of the data unit and a second extreme value data chunk of a previously fetched data unit;
      updating the value of the mask; and
      jumping to the stage of fetching a new data unit of the plurality of data units that is located at another address that is associated with the data block base address and the data block size field, until the whole data block is fetched.

2. The method according to claim 1 wherein the updating comprises rotating the mask by a data unit size.

3. The method according to claim 1 wherein comparing between values of valid data chunks comprises assigning default values to non-valid data chunks.

4. The method according to claim 3 wherein comparing between values of valid data chunks comprises comparing between default values of non-valid data chunks and between values of valid data chunks.

5. The method according to claim 1 wherein comparing between values of valid data chunks comprises providing a pair of data chunks and data chunk validity information to a comparison unit, assigning a default value to a non-valid data chunk, comparing, by the comparison unit, between values of the data chunks to provide an identity of an extreme value data chunk of the pair of data chunks and to provide an extreme value of the pair of data chunks.

6. The method according to claim 1 wherein:
   the instruction comprises a data block size location field; and
   the method further comprises determining to jump to the stage of fetching a new data unit, until the whole data block is fetched, based upon the data block size location field.

7. The method according to claim 1 wherein:
   the instruction comprises a base address location field; and
   a first data unit of the plurality of data units is fetched from a location based upon the base address location field.

8. A device for locating an extreme value data chunk within a data block, the device comprises:
   a memory unit adapted to store a data block comprising a plurality of data units;
   a processor adapted to fetch an instruction and selectively generate control signals in response to the fetched instruction, wherein the instruction includes:
   a data chunk size field;
   a data block size field; and
   a data block base address field; and
   a hardware accelerator, coupled to the memory unit, wherein in response to executing only the instruction, the hardware accelerator is adapted to:
      receive control signals from the processor based on the instruction, the control signals including a data unit size determined based upon a location of the instruction,
      fetch a particular data unit of the plurality of data units, wherein the particular data unit comprises multiple data chunks, wherein the particular data unit is located at an address that is associated with the data block base address and the data block size field, and the size of each data chunk being determined by the data chunk size field;
      selectively mask a portion of the fetched data chunks in response to a value of a mask, wherein a portion of the fetched data chunks that are unmasked are valid data chunks;
      compare between values of valid data chunks of the particular data unit to provide a extreme value data chunk of the particular data unit; and
      determine, based on the instruction:
         whether to update the value of the mask;
         if all data units of the plurality of data units have been fetched; and
         if all data units have not been fetched, to fetch another data unit of the plurality of data units that is located at another address that is associated with the data block base address and the data block size field.

9. The device according to claim 8 wherein the hardware accelerator is adapted to rotate the mask by a data unit size.

10. The device according to claim 8 wherein the hardware accelerator is adapted to perform multiple comparison operations in parallel.

11. The device according to claim 8 wherein the hardware accelerator is adapted to assign default values to non-valid data chunks.

12. The device according to claim 11 wherein the hardware accelerator is adapted to compare between default values of non-valid data chunks and between values of valid data chunks.

13. The device according to claim 8 wherein the hardware accelerator comprises multiple comparison units, wherein a comparison unit is adapted to receive a pair of data chunks and data chunk validity information, assign a default value to a non-valid data chunk, compare between values of the data chunks to provide an identity of an extreme value data chunk of the pair of data chunks and to provide an extreme value of the pair of data chunks.

14. The device according to claim 8 wherein the processor is adapted to extract a data unit size value from the fetched instruction.

15. A method for locating an extreme value data chunk within a data block, the method comprises:
   fetching by a processor, an instruction, wherein the instruction comprises:
      a data chunk size field;
      a data block size field; and
      a data block base address field; and
   in response to executing the instruction:
      fetching, in response to a content of the instruction, a data unit of a plurality of data units that comprises multiple data chunks, wherein the data block comprises the plurality of data units, wherein the data unit is located at an address that is associated with the data block base address and the data block size field, and the size of each data chunk being determined by the data chunk size field;
      selectively masking the fetched data chunks in response to a value of a mask;
      comparing, by a hardware accelerator, between values of valid data chunks of the data unit to provide an extreme value data chunk of the data unit; wherein valid data chunks include un-masked data chunks that belong to the data block;
      updating the value of the mask; and
      jumping to the stage of fetching a new data unit of the plurality of data units that is located at another address that is associated with the data block base address and the data block size field, until the whole data block is fetched.

16. The method according to claim 15 wherein the updating comprises rotating the mask by a data unit size.

17. The method according to claim 15 wherein the comparing comprises assigning default values to non-valid data chunks.

18. The method according to claim 17 wherein the comparing comprises comparing between default values of non-valid data chunks and between values of valid data chunks.

19. The method according to claim 15 wherein the comparing comprises:
   providing a pair of data chunks and data chunk validity information to a comparison unit;
   assigning a default value to a non-valid data chunk; and
   comparing, by the hardware accelerator, between values of the data chunks to provide an identity of an extreme value data chunk of the pair of data chunks and to provide an extreme value of the pair of data chunks.

20. The method according to claim 15 wherein the fetching comprises fetching an instruction that comprises a data unit size value and a data unit size location field.

* * * * *